United States Patent
Anderson et al.

[11] Patent Number: 5,816,626
[45] Date of Patent: Oct. 6, 1998

[54] SPRING LOCK COUPLING

[75] Inventors: Claudia Mills Anderson; David Alan Campbell, both of Richmond, Ind.; Fred Georg Schroeder, Grosse Ile, Mich.

[73] Assignee: Ford Motor Company, Dearborn, Mich.

[21] Appl. No.: 567,617

[22] Filed: Dec. 5, 1995

[51] Int. Cl.$^6$ .................................................. F16L 39/02
[52] U.S. Cl. ........................ 285/318; 285/351; 285/231
[58] Field of Search .................................... 285/318, 351, 285/231

[56] References Cited

U.S. PATENT DOCUMENTS

| | | |
|---|---|---|
| 2,757,942 | 8/1956 | Eberhart . |
| 2,829,909 | 4/1958 | Magnani ................................. 285/351 |
| 2,914,344 | 11/1959 | Anthes . |
| 2,939,728 | 6/1960 | Bitel . |
| 3,339,947 | 9/1967 | Maisey . |
| 3,439,944 | 4/1969 | Leutenegger . |
| 3,700,112 | 10/1972 | Maeshiba . |
| 3,918,679 | 11/1975 | Silvana . |
| 4,055,359 | 10/1977 | McWethy . |
| 4,133,563 | 1/1979 | Yamazaki ............................... 285/231 |
| 4,193,616 | 3/1980 | Sarson et al. . |
| 4,362,323 | 12/1982 | Lodder et al. . |
| 4,376,525 | 3/1983 | Fremy . |
| 4,401,326 | 8/1983 | Blair . |
| 4,606,564 | 8/1986 | Kurachi . |
| 4,632,434 | 12/1986 | Proctor et al. . |
| 4,641,859 | 2/1987 | Walters . |
| 4,647,082 | 3/1987 | Fournier et al. . |
| 4,659,119 | 4/1987 | Reimert . |
| 4,664,421 | 5/1987 | Jones ..................................... 285/231 |
| 4,715,624 | 12/1987 | Frye ...................................... 285/351 |
| 4,728,130 | 3/1988 | Corzine . |
| 4,750,762 | 6/1988 | Corzine . |
| 4,783,101 | 11/1988 | Peterson et al. . |
| 4,804,290 | 2/1989 | Balsells . |
| 4,850,622 | 7/1989 | Suzuki . |
| 4,872,710 | 10/1989 | Konecny et al. . |
| 4,906,031 | 3/1990 | Vyse . |
| 4,923,228 | 5/1990 | Laipply . |
| 4,991,882 | 2/1991 | Gahwiler . |
| 5,002,314 | 3/1991 | Smith . |
| 5,005,877 | 4/1991 | Hayman . |
| 5,094,494 | 3/1992 | McConnell ............................. 285/351 |
| 5,195,787 | 3/1993 | Bartholomew . |
| 5,211,427 | 5/1993 | Washizu . |
| 5,364,131 | 11/1994 | Hartsock et al. . |

FOREIGN PATENT DOCUMENTS

| | | |
|---|---|---|
| 91500 | 10/1961 | Denmark ............................... 285/231 |
| 0 340 194 A1 | 11/1989 | European Pat. Off. . |
| 1203752 | 1/1960 | France ................................... 285/231 |
| 1277984 | 12/1961 | France . |
| 29 05 035 A1 | 8/1979 | Germany . |
| 4-29693 (A) | 1/1992 | Japan . |
| 5-52286 (A) | 3/1993 | Japan . |
| 7802712 | 10/1979 | Netherlands . |
| 1201304 | 8/1970 | United Kingdom ................... 285/231 |
| 1494669 | 12/1977 | United Kingdom ................... 285/351 |
| 2205137 | 11/1988 | United Kingdom ................... 285/318 |
| 4008171 | 4/1994 | WIPO ................................... 285/318 |

*Primary Examiner*—Eric K. Nicholson
*Attorney, Agent, or Firm*—Raymond L. Coppiellie

[57] ABSTRACT

There is disclosed herein a tubular coupling comprising a first tube, a cage disposed on an end portion of the first tube, a bead for retaining the cage on the end portion of the first tube and a second tube telescopically engageable with the first tube. The coupling further include a spring disposed around the cage for preventing telescopic disengagement of the second tube from the first tube as well as a plurality of o-rings disposed on the end of the first tube. One of the o-rings is disposed at the pivot point of the coupling, the pivot point being defined as the midpoint of the distance between a first contact point and a second contact point between the first tube and the second tube when the tubes are engaged.

9 Claims, 1 Drawing Sheet

_5,816,626_

SPRING LOCK COUPLING

BACKGROUND OF THE INVENTION

1. Field of the Invention

The present invention relates to a spring lock or quick-connect tubular coupling for a pair of tubes one of which has an end portion telescopically disposed within an end portion of the other.

2. Discussion of the Related Art

In many automotive, household appliance and machine tool applications, fluid conduits or tubes that carry pressurized fluids must be capable of being disconnected to permit repair or replacement of components of the system.

One such type of connection is shown in U.S. Pat. No. 4,055,359 to McWethy, assigned to the assignee of the present application, and which is shown at generally in FIG. 1. The '359 patent discloses a quick-connect tubular coupling which facilitates initial connection and subsequent disconnection of the pair of tubes. The '359 connection was a key contribution to the art enabling manual connections of fluid pressure lines in a few seconds by using (i) a radially outwardly flared lip to expand and pass a garter spring thereby and (ii) a cage to retain the spring in the passed condition.

Specifically, the '359 patent utilizes an annular cage externally mounted on the inner tube in axially spaced relation to the free end of its end portion. The cage is held on the inner tube against axial displacement. The end portion of the outer tube is flared outwardly at its free end and extends into the cage. A circular spring means such as a garter spring is interposed between the flared end portion of the other tube and the cage and is disposed to prevent axial movement of one tube relative to the other. Between the telescoped end portion are a pair of o-rings that are compressed in a sealed mode to prevent leakage through the coupling as is shown generally in FIG. 1.

As shown in FIG. 1, the pair of o-rings are placed to prevent leakage through the coupling since a gap, indicated by G, is present between the male and female portions of the connection. The gap is necessary for the male portion to fit within the female portion of the connection. Both of the o-rings are dynamic, meaning they move as the fitting vibrates. The fitting vibrates because of the gap and the fluid moving therethrough.

Therefore, it would advantageous to provide a coupling which accommodates the vibration of the fitting.

SUMMARY OF THE INVENTION

It is an object of the present invention to provide a spring lock coupling which includes a static o-ring to lower the leakage potential of the coupling and improve its durability. It is a further object of the present invention to provide a spring lock coupling which is economical and uncomplicated to manufacture.

The above and other objects of the present invention are accomplished by a tubular coupling comprising a first tube having an end portion with a terminal end, the end portion being connected to the first tube; a cage means disposed on the end portion of the first tube, the cage means including a radial base portion having a circular aperture through which the end portion of the first tube projects, a curved wall portion connected to the radial base portion, a curved wall portion forming an annular chamber, and a circular flange portion connected to the curved wall portion and angularly inclined towards the end portion of the first tube in the general direction of the terminal end. The circular flange terminates in radially spaced relation toward the outer surface of the end portion of the first tube. The tubular coupling further comprises means for retaining the cage means on the end portion of the first tube to hold the cage means against axial displacement and a second tube having an end portion telescopically mounted on the end portion of the first tube. The end portion of the second tube includes a cylindrical portion, a transition portion and a flange portion circumferentially surrounding the terminal edge thereof. The flange portion projects into the space between the surface of the end portion of the first tube and the cage means when the first and second tube are in engagement. The tubular coupling further comprises spring means disposed within the cage means interposed between the flange portion of the second tube and the circular flange portion which prevents telescopic disengagement of the second tube from the first tube when the first and second tubes are engaged; and sealing means disposed between the end portion of the first tube and the end portion of the second tube for preventing leakage between the end portions. The sealing means include a plurality of o-rings laterally disposed adjacent to the circular flange portion of the cage means, one of the plurality of the o-rings being disposed at a pivot point coupling. The pivot point of the coupling is defined as the midpoint of the distance between a first contact point and a second contact point between the first tube and the second tube when the first and second tubes are in engagement.

These and other objects, features advantages of the present invention will become apparent from the drawings, detailed description and claims which follow.

DETAILED DESCRIPTION OF THE PREFERRED EMBODIMENTS

Figure 1:
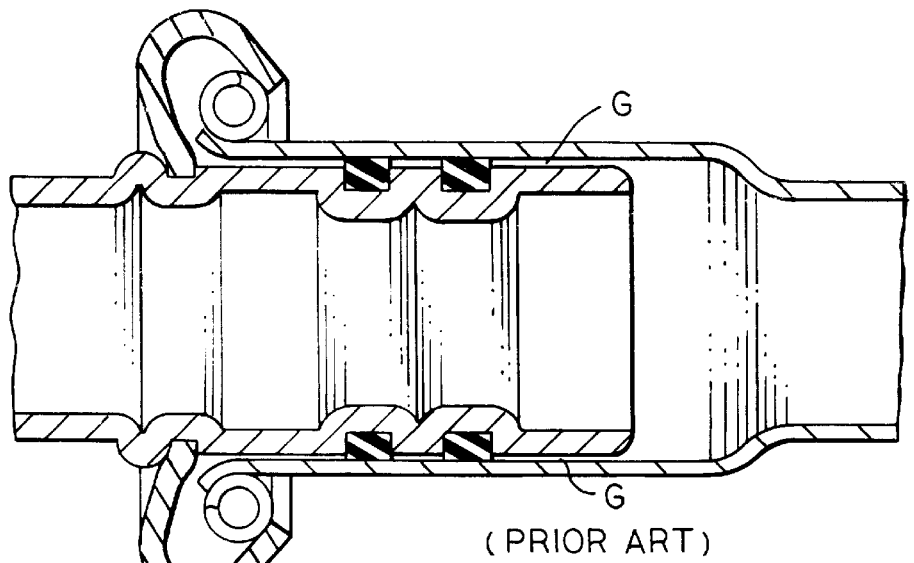
FIG. 1 is a cross-sectional view a prior art spring lock coupling.
Figure 2:
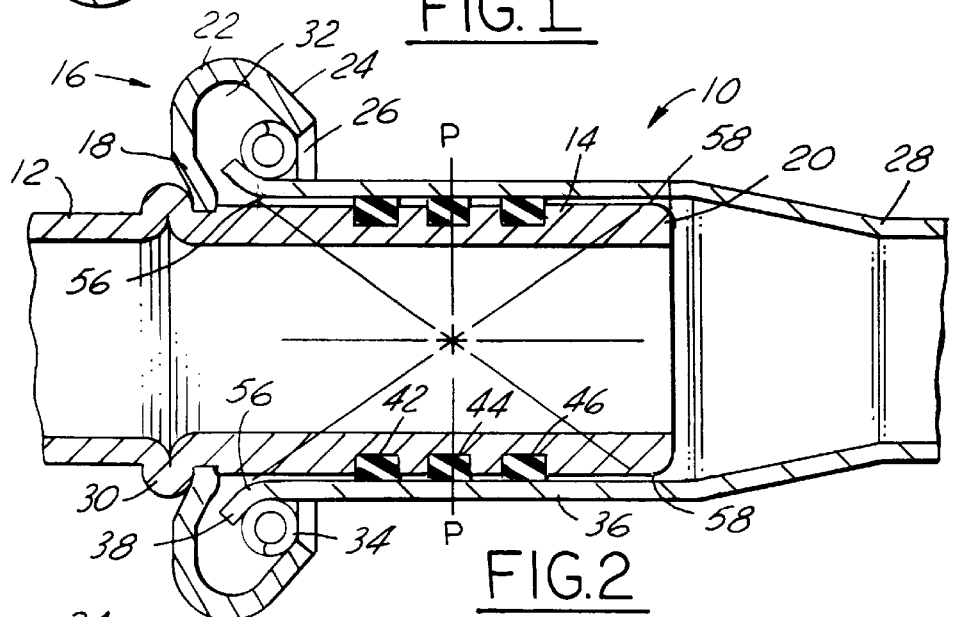
FIG. 2 is a cross-sectional view of a spring lock coupling structured in accord with the principles of the present invention.
Figure 3:
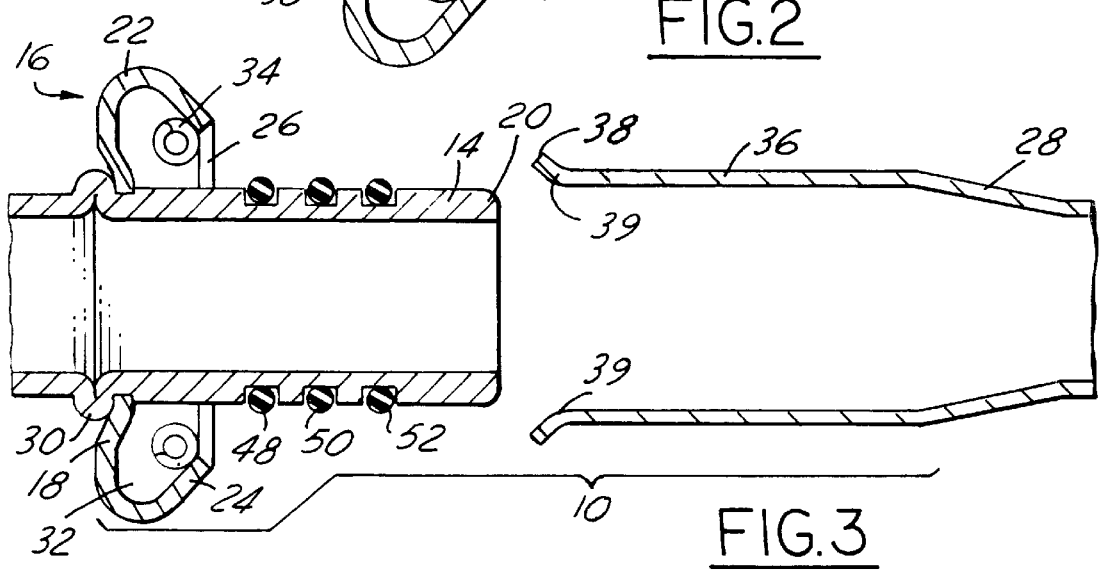
FIG. 3 is a cross-sectional, exploded view of a spring lock coupling of FIG. 2.

FIGS. 2 and 3 disclose a spring lock coupling 10 of the present invention. The coupling 10 includes a first tube 12 having an end portion or male fitting 14 connected thereto. The male fitting 14 typically is formed integrally with the tube 12.

A cage 16 is attached to the end portion 14 of the first tube 12 by a radial base portion 18. The cage 16 also includes a curved wall portion 22 and a circular flange portion 24. The curved wall portion 22 is connected to the radial base portion 18. The circular flange portion 24 is connected to the curved wall portion 22 and is angularly inclined toward the terminal end 20 of the end of portion 14. The circular flange portion 24 ends at such a point that there is an access opening 26 which allows a portion of the second or outer tube 28 to be introduced thereinto.

The cage 16 is attached at the radial base portion 18 to the end portion 14 of the first tube 12 by a crimped bead 30. Other types of connections are also possible, such as welding, soldering, etc., and are well within the knowledge of one skilled in the art. The cage 16 defines an annular space 32 around the end portion 14 of the first tube 12. The curved wall portion 22 defines the largest diameter location of the annular space 32. Located inside the annular space 32 and normally disposed on the outer portion of the end portion 14 is a garter spring 34 which is capable of holding the coupling 10 together.

The second tube 28 includes an end portion 36 which is generally cylindrical and slightly enlarged from the diameter from the second tube 28. At the terminal end of the end portion 36 is a circumferential flange 38 and a transition portion 39 between the circumferential flange 38 and the generally cylindrical end portion 36. The flange portion 38 is inserted under the garter spring 34 and holds the coupling together as is taught in the '359 patent, the disclosure of which is hereby incorporated by reference.

The end portion 14 of the first tube 12 includes three o-ring grooves 42, 44 and 46 for receiving o-rings 48, 50 and 52, respectively, for sealingly preventing leakage between the two tubes 12 and 28. The o-rings 48 and 52 are dynamic o-rings which move as the coupling 10 vibrates due to fluid flowing therethrough. The o-ring 50, disposed between o-rings 48, 52 is a static o-ring which means it does not move as the fitting vibrates. To be a static o-ring, the o-ring 50 must be placed at the pivot point of the coupling. The pivot point, shown as line P—P in FIG. 2 is the point (or vertical axis) about which the end portion 14 of the first tube 12 and the end portion 36 of the second tube 28 pivot due to the gap G between the fittings, respectively. This pivot axis is defined as the midpoint between a first contacting point 56 and a second contacting point 58 of the engaged fitting. The first contact point 56 is defined as that circumferential point at which the second tube transition portion 39, immediately adjacent the flange portion 38 of the end portion 36 contacts the outer surface of the first tube end portion 14 when the first and second tubes are engaged. The second contact point is defined as the circumferential point of contact of the first tube terminal end 20 with the inner surface of the second tube 28 end portion 36 when the first and second tubes are engaged. The first point of contact is shown at 56 at FIG. 2 while the second point of contact is shown at 58 in FIG. 2. If a diagonal line is drawn between respective opposite first and second contact points as shown in FIG. 2, the intersection of those diagonal lines occurs at the pivot point of the coupling, identified at line P—P of FIG. 2. The o-ring 50 placed at this pivot point does not move as the first tube end portion 14 vibrates relative to the second tube end portion 36 during fluid flow. As such, the o-ring 50 provides greater sealing benefit and improve durability of the quick-connect coupling. Reduced permeation leakage is also provided by adding the third o-ring 50 at the pivot point of the coupling.

The assembly of the coupling of the present application is very similar to that described in the '359 patent and therefore is unnecessary for description here. The disclosure of the '359 patent relating to assembly and disassembly of the coupling is hereby incorporated by reference. The materials for the coupling can be selected from those well known to those skilled in the art. Specific materials which can be utilized include low carbon steel, aluminum and plastics. The present invention has been described with certain preferred embodiments, and those skilled in the art, in view of present disclosure, will appreciate that numerous alternative embodiments of the invention are within the scope of the following claims.

It is claimed:

1. A tubular coupling comprising:
   a first tube having an end portion with a terminal end, the end portion being connected to the first tube;
   a cage means disposed on the end portion of the first tube, the cage means including:
   a radial base portion having a circular aperture through which the end portion of the first tube projects;
   a curved wall portion connected to the radial base portion, the curved wall portion forming an annular chamber; and
   a circular flange portion connected to the curved wall portion and angularly inclined toward the end portion of the first tube in the general direction of the terminal end, the circular flange terminating in radially spaced relation to an outer surface of the end portion of the first tube;
   means for retaining the cage means on the end portion of the first tube to hold the cage means against axial displacement;
   a second tube having an end portion telescopically mounted on the end portion of the first tube, the end portion of the second tube including a cylindrical portion, a transition portion and a flange portion circumferentially surrounding the terminal edge thereof, the flange portion projecting into the space between the surface of the end portion of the first tube and the cage means when the first and second tube ends are in engagement;
   a spring means disposed within the cage means interposed between the flange portion of the second tube and the circular flange portion, thereby preventing telescopic disengagement of the second tube from the first tube when the first and second tubes are in engagement; and
   sealing means disposed between the end portion of the first tube and the end portion of second tube for preventing leakage between the end portions, the sealing means including:
   a plurality of O-rings laterally disposed on the terminal end of the first tube, one of the plurality of O-rings being disposed at a pivot point of the coupling, the pivot point being defined as the midpoint of the distance between a first contact point and a second contact point between the first tube and the second tube when the first and second tubes are in engagement, said first contact point being defined as the contact of the second tube transition portion and the outer surface of the first tube when the first and second tubes are engaged.

2. A tubular coupling according to claim 1, wherein said second contact point is defined as the contact of the first tube terminal end with the inner surface of the second tube when the first and second tubes are engaged.

3. A tubular coupling according to claim 1, wherein the first end portion of the first tube is integral with the first tube.

4. A tubular coupling according to claim 1, wherein the cage means is disposed on the end portion of the first tube in an axially inwardly spaced relation to the terminal end thereof.

5. A tubular coupling according to claim 1, wherein the retaining means engages with the radial base portion of the cage means.

6. A tubular coupling according to claim 1, wherein the spring means comprises a garter spring.

7. A tubular coupling according to claim 1, wherein the retaining means is formed by a bead in the end portion of the first tube.

8. A tubular coupling according to claim 1, wherein the plurality of O-rings includes three O-rings.

9. A tubular coupling comprising:
   a first tube having an end portion with a terminal end, the end portion being connected to the first tube;

a cage means disposed on the end portion of the first tube, the cage including:
- a radial base portion having a circular aperture through which the end portion of the first tube projects;
- a curved wall portion connected to the radial base portion, the curved wall portion forming an annular chamber; and
- a circular flange portion connected to the curved wall portion and angularly inclined toward the end portion of the first tube in the general direction of the terminal end, the circular flange terminating in radially spaced relation to an outer surface of the end portion of the first tube;

means for retaining the cage on the end portion of the first tube to hold the cage against axial displacement, the retaining means being formed by beads in the end portion of the first tube;

a second tube having an end portion telescopically mounted on the end portion of the first tube, the end portion of the second tube including a curved portion and a flange portion circumferentially surrounding the terminal edge thereof, the flange portion projecting into the space between the surface of the end portion of the first tube and the cage when the first and second tube ends are in engagement;

a garter spring disposed within the cage interposed between the flange portion of the second tube and the circular flange portion, thereby preventing telescopic disengagement of the second tube from the first tube when the first and second tubes are in engagement; and a first point of contact defined by the contact of the second tube curved portion and the outer surface of the first tube when the first and second tubes are engaged;

a second point of contact defined by the contact of the first tube terminal end and the inner surface of the second tube when the first and second tubes are engaged;

three O-rings disposed between the end portion of side first tube and the end portion of second tube for preventing leakage between the end portions, one of the O-rings being disposed at a pivot point of the coupling, the pivot point being defined as the midpoint of the distance between the first and second contact points.

\* \* \* \* \*